United States Patent [19]
Zwan et al.

[11] Patent Number: 5,991,270
[45] Date of Patent: *Nov. 23, 1999

[54] DYNAMIC COMMUNICATION LINE ANALYZER APPARATUS AND METHOD

[75] Inventors: Bryan J. Zwan, Clearwater; Kenneth T. Myers, Palm Harbor, both of Fla.

[73] Assignee: Digital Lightwave, Inc., Clearwater, Fla.

[*] Notice: This patent is subject to a terminal disclaimer.

[21] Appl. No.: 09/005,623

[22] Filed: Jan. 9, 1998

Related U.S. Application Data

[63] Continuation of application No. 08/619,847, Mar. 19, 1996, Pat. No. 5,805,571.

[51] Int. Cl.$^6$ .................................. H04J 1/16; H04J 3/14
[52] U.S. Cl. .............................. 370/249; 379/5; 371/20.5
[58] Field of Search ..................................... 370/241, 242, 370/243, 244, 245, 246, 247, 248, 249, 250; 371/20.1–20.5; 379/1, 4, 5, 21–23, 26–28

[56] References Cited

U.S. PATENT DOCUMENTS

| | | | |
|---|---|---|---|
| 3,956,601 | 5/1976 | Harris et al. | 179/175.3 |
| 4,545,011 | 10/1985 | Lon et al. | 364/200 |

(List continued on next page.)

OTHER PUBLICATIONS

Anritsu Wiltron: SONET/SDH/BERTs—Product Brochure.
TTC: FIBERSCAN 1000, Dec. 1995—Product Brochure and Specification Sheet.
TTC: T–BERD 310 Communcations Analyzer, Sep. 1995—Product Brochure and Specification Sheet.
TTC: Quality Test Instruments—Marketing Brochure.
TTC: Qulaity Test Instuments, Mar. 1995—Marketing Brochure.
Tektronix: Automate Your Field Testing with the CTS 710 SONET Test Set, 1993—Product Brochure.
Tektronix: CTS 710 Tektronix Portable SONET Test Set, 1993—Product Specification Sheet.
Tektronix, Inc.: CTS 710 SONET/DS3/DS1 Test Set, 1995—Product Brochure and Specification Sheet.
Hewlett Packard: Selected Sections of Product Catalog, Including SONET/SDH Test Sets, Digital Transmission Testers, and ATM/Broadband Test Systems.
Hewlett Packard: 156MTS SONET Maintenance Test Set; Installation and Maintenance Testing, for SONET, ATM and T–Carrier, 1996—Product Brochure and Specification Sheet.
Hewlett Packard: 156MTS SONET Maintenance Test Set; Installation and Maintenance Testing, from T–Carrier to SONET—Product Brochure and Specification Sheet.
Microwave Logic: ST–104B STS–1/VT1.5 SONET Test Set—Product Specification Sheet.
Microwave Logic: Comprehensive SONET Test Solutions; STS–112 Portable SONETest™ Transmission Analyzer, Jul. 1995—Product Brochure and Specification Sheet.
Microwave Logic: STS–1/DS3 SONET Test Set—Product Specification Sheet.
Microwave Logic: Bit Error Rate Test—Product Brochure.
Microwave Logic: SONET Testing—Product Brochure.

*Primary Examiner*—Ajit Patel
*Assistant Examiner*—Bob A. Phunkulh
*Attorney, Agent, or Firm*—White & Case LLP

[57] ABSTRACT

A novel high speed telecommunications testing apparatus and method which utilizes field programmable gate arrays to produce dynamic test modules for DS1, DS3, SONET and ATM signals interconnected by a high speed switching fabric. The high speed switch permits the direct exchange of signals from one test module to another thereby permitting simultaneous testing of different communications line protocols and further provides for multiple tests on a single data stream. Individual line interfaces are provided for DS1, DS3, and SONET lines which terminate and frame incoming and outgoing signals. Data exchange between modules in accomplished through the high speed switch fabric.

2 Claims, 10 Drawing Sheets

U.S. PATENT DOCUMENTS

| | | | |
|---|---|---|---|
| 4,708,422 | 11/1987 | Arnoux | 350/96.15 |
| 4,841,437 | 6/1989 | Lubarsky et al. | 364/200 |
| 4,894,829 | 1/1990 | Monie et al. | 371/20.1 |
| 5,121,342 | 6/1992 | Szymborski et al. | 364/412 |
| 5,157,665 | 10/1992 | Fakhraie-Fard | 371/20.1 |
| 5,173,896 | 12/1992 | Dariano | 370/13 |
| 5,197,062 | 3/1993 | Picklesimer | 370/13 |
| 5,251,204 | 10/1993 | Izawa et al. | 370/15 |
| 5,260,970 | 11/1993 | Henry et al. | 375/10 |
| 5,343,461 | 8/1994 | Barton et al. | 370/13 |
| 5,355,238 | 10/1994 | Kight et al. | 359/135 |
| 5,367,394 | 11/1994 | Chuter et al. | 359/110 |
| 5,377,259 | 12/1994 | Butler et al. | 379/93 |
| 5,434,845 | 7/1995 | Miller | 370/13 |
| 5,446,680 | 8/1995 | Sekiya et al. | 364/550 |
| 5,450,416 | 9/1995 | Bowcutt et al. | 371/20.1 |
| 5,451,839 | 9/1995 | Rappaport et al. | 375/224 |
| 5,455,832 | 10/1995 | Bowmaster | 371/20.1 |
| 5,490,249 | 2/1996 | Miller | 395/183.14 |
| 5,491,697 | 2/1996 | Tremel et al. | 371/5.1 |
| 5,495,470 | 2/1996 | Tyburski et al. | 370/14 |
| 5,506,709 | 4/1996 | Segal et al. | 359/110 |
| 5,566,161 | 10/1996 | Hartmann et al. | 370/15 |
| 5,566,162 | 10/1996 | Gruber et al. | 370/13 |
| 5,619,489 | 4/1997 | Chang et al. | 370/241 |

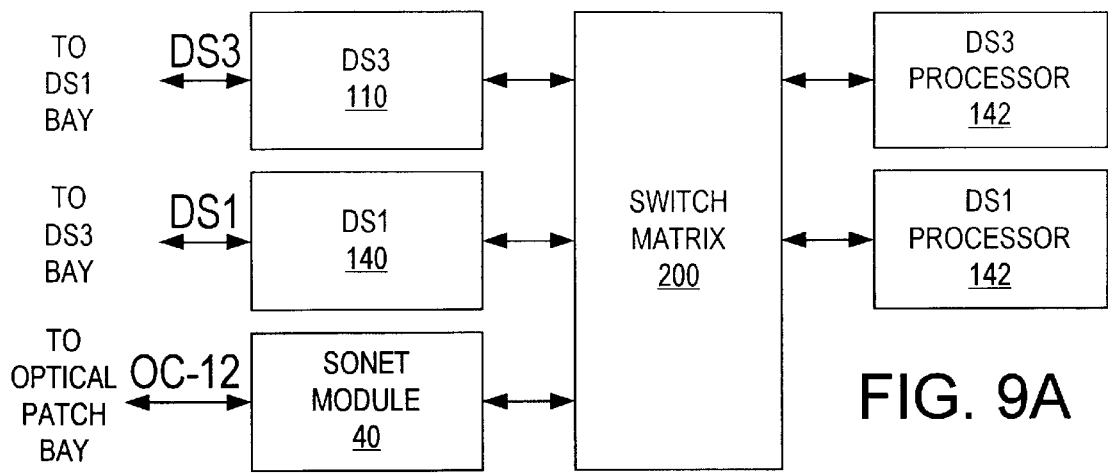
FIG. 9A
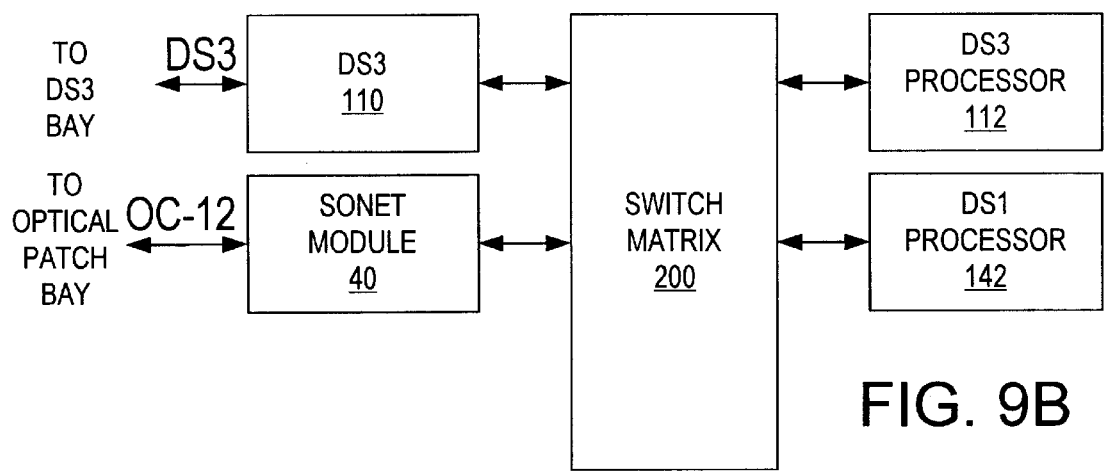
FIG. 9B
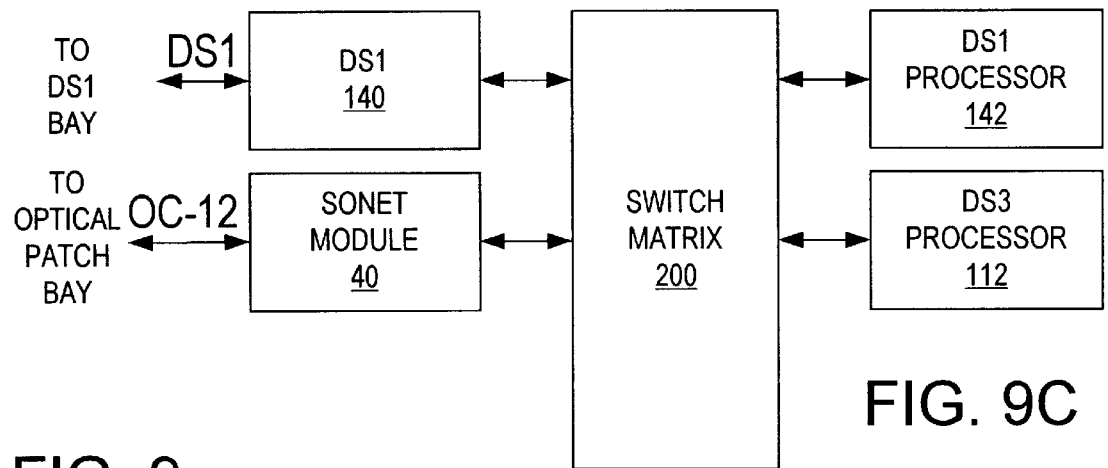
FIG. 9C
FIG. 9

DYNAMIC COMMUNICATION LINE ANALYZER APPARATUS AND METHOD

This is a continuation application of U.S. Ser. No. 08/619,847, filed on Mar. 19, 1996, now U.S. Pat. No. 5,805,571. The entire disclosure of the prior application is considered as being part of the disclosure of the application and is hereby incorporated by reference.

FIELD OF THE INVENTION

This invention relates to the field of communications line testing and evaluation. More particularly, the present invention relates to an apparatus and method of high speed digital communications line testing and evaluation. The invention consists of a precision test instrument for receiving, generating, demapping, mapping, extracting, combining and manipulating high speed digital bit streams common in modern telecommunications networks. The present invention further includes a novel central switching matrix which in turn supports simultaneous testing and evaluation of several circuits and payloads at one time. The present invention further relates to the method of operating the precision test instrument to maximize its utility and efficiency as a test instrument.

BACKGROUND OF THE INVENTION

Over the last two decades, the telecommunications industry has progressed from a copper based, low bandwidth network to a fiber optic based, high bandwidth network. Although this evolution is ongoing, there has been a significant investment in fiber optic plant which often lies adjacent copper based elements in the same network. As a result, testing devices used to monitor and evaluate communications lines are now required to accept both copper and fiber optic lines and protocols. The older T1, DS0, DS1, and DS3 formats used in copper plant feeds into the same nodes as OC-1, OC-3, OC-12, and OC-48 fiber optic modalities and these higher speed optical signals contain the lower order signals as embedded bit streams. It is therefore desirable to produce a test device that can fully extract, test and evaluate each of these formats within a single platform. It is further desirable to permit multiple tests of a single bit stream by routing signals from one signal modality to another through a high speed internal switch fabric. It is further desirable to produce a test device that can terminate and evaluate several high speed signals simultaneously. It is further desirable to produce a test device that can terminate and process very high speed signals without resort to expensive components.

Others have attempted to produce a fully integrated test device for the multitude of communications signal protocols in use today. An early attempt to address this problem was proposed by Harris et al. in U.S. Pat. No. 3,956,601. Harris discloses an early transmission line test device which includes a transmitter section to generate test signals, a receive section to capture test signals, and a display to report data. The Harris test device tests for various parameter conditions including envelope delay, noise, and distortion but each test modality takes place sequentially, with a selection mechanism to advance the instrument from one test to the next. A significant limitation of this approach is that only a single parameter can be tested at a time. Moreover, this early device omits the facility to test high speed optical signals, an essential component of today's telecommunication network.

A further attempt was proposed by Szymborski et al. in U.S. Pat. No. 5,121,342. Szymborski discloses a multi-mode test device which evaluates analog and digital telecommunications signals such as T1 and ISDN protocol signals but does not include the capability of processing high speed optical. signals. Szymborski utilizes a single programmable gate array to provide an interface for different transmission protocols. The line interface can be reconfigured to accommodate a different line protocol through operator input. However, the Szymborski system is limited to processing one signal at a time with its gate array devoted to one particular protocol of interest. No capability exists to test multiple lines or multiple protocols simultaneously.

Highly specialized communications line test devices have been proposed by others such as Bowmaster in U.S. Pat. No. 5,455,832 and Kight et al. in U.S. Pat. No. 5,355,238. These disclose very sophisticated communications line test devices which demonstrate the advanced nature of the SONET protocol testing art. However, neither of these advanced designs permits the exchange of signals between multiple protocols and neither permits testing of multiple protocols simultaneously. Accordingly, these disclosures contemplate the use of a dedicated line tester for each protocol under consideration.

Others have proposed commercial devices which purport to test and analyze, telecommunications lines. Companies such as Tektronix, Microwave Logic, Telecommunications Techniques Corporation, and Hewlett Packard/Cerjac have attempted to provide a test device for the telecommunications industry. Each of these devices are large, bulky test sets capable of interface with only one signal at a time. None of these devices is capable of simultaneous testing of more than one line or more than one communications protocol. Still further, none of these prior art systems provide dynamic test protocols involving multiple tests on a plurality of communications streams while maintaining the full test capability of a individual test device. As a result, qualitative comparison between different component signals in a single high bandwidth composite signal is not fully supported in prior art systems. Further, testing of multiple inbound signal protocols must be conducted sequentially, requiring a much longer test time than is desirable. For example, to test a switch which carries DS1, DS3, and SONET signals, the technician must first mate the prior art systems to the switch under evaluation and initiate a test sequence for the DS1 protocol. Upon conclusion of that test, the technician must alter the cabling of the device and initiate the DS3 test sequence. Upon the conclusion of that test, the technician must again alter the cabling of the device and initiate the SONET test sequence. This results in long test times which significantly increase maintenance and operations costs for the user.

The difficulties and limitations suggested in the preceding are not intended to be exhaustive but rather among the many which may tend to reduce the effectiveness and user satisfaction with prior communications line test devices and methods and the like. Other noteworthy problems may also exist; however, those presented above should be sufficient to demonstrate that prior communications line test devices and methods appearing in the past will admit to worthwhile improvement.

SUMMARY OF THE INVENTION

A novel high speed telecommunications testing apparatus and method which utilizes field programmable gate arrays to produce dynamic test modules for DS1, DS3, SONET and ATM signals interconnected by a high speed switching fabric. The present invention includes a fully integrated test device with centralized microprocessor control. The high speed switch permits the direct exchange of signals from one test module to another. The dynamic nature of the device supports simultaneous testing of communications lines in multiple protocols and further provides for multiple tests on a single data stream. Individual line interfaces are provided for DS1, DS3, and SONET lines which terminate and frame incoming and outgoing signals. The present invention further includes processing sections associated with DS1, DS3, SONET, and ATM signals to analyze and extract desired data. The present invention further includes error generation and insertion in all protocols to permit dynamic error testing. The present invention further includes an internal multiplexer to permit building and extraction of DS1 and DS3 signals.

OBJECTS OF THE INVENTION

It is therefore a general object of the invention to provide a novel communications signal test apparatus and method that will obviate or minimize the problems previously described with reference to the prior art.

It is a general object of the invention to provide a novel communications signal test apparatus and method that will facilitate full function testing of all common SONET and electrical protocols.

It is a general object of the invention to provide a novel communications signal test apparatus and method that will support simultaneous, uninterrupted testing of different communications protocols.

It is another general object of the invention to provide a novel communications signal test apparatus and method that permits ease of use and efficient, portable operation.

It is another object of the invention to provide a novel communications signal test apparatus and method that includes DS3 and DS1 signal drop and insert from SONET signal streams.

It is another object of the invention to provide a novel communications signal test apparatus and method that includes DS1 signal drop and insert from DS3 signal streams.

It is a further object of the invention to provide a novel communications signal test apparatus and method that includes DS1 and DS3 mapping and demapping within a single unitary test bed.

It is another object of the invention to provide a novel communications signal test apparatus and method that includes an improved user interface and method of data presentation which facilitates use and operation of the device.

It is a further object of the invention to provide a novel communications signal test apparatus and method that includes a high speed switch fabric to facilitate the extraction and interchange of signals between protocols.

It is another object of the invention to provide a novel communications signal test apparatus and method that will provide for simultaneous testing and multiplexing of self generated and received signals.

It is a further object of the invention to provide a novel communications signal test apparatus and method that permits variable test protocols.

It is another object of the invention to provide a novel communications signal test apparatus and method that supports remote operation and data acquisition to facilitate centralized operator control and data procurement.

It is still another object of the invention to provide a novel communications signal test apparatus and method that includes random error generation capabilities.

It is still another object of the invention to provide a novel communications signal test apparatus and method that utilizes a software based design to facilitate feature enhancement, maintenance, and calibration.

It is another object of the invention to provide a novel communications signal test apparatus and method that includes memory structures to support historical data compilation and reporting.

Other advantages and meritorious features of the present invention will be understood from the description of the preferred embodiments, the appended claims, and the drawings.

BRIEF DESCRIPTION OF THE DRAWINGS

FIGS. 9A–C are block diagrams of the novel simultaneous testing methodology supported by the present invention.

DETAILED DESCRIPTION OF THE PREFERRED EMBODIMENTS

Figure 1:
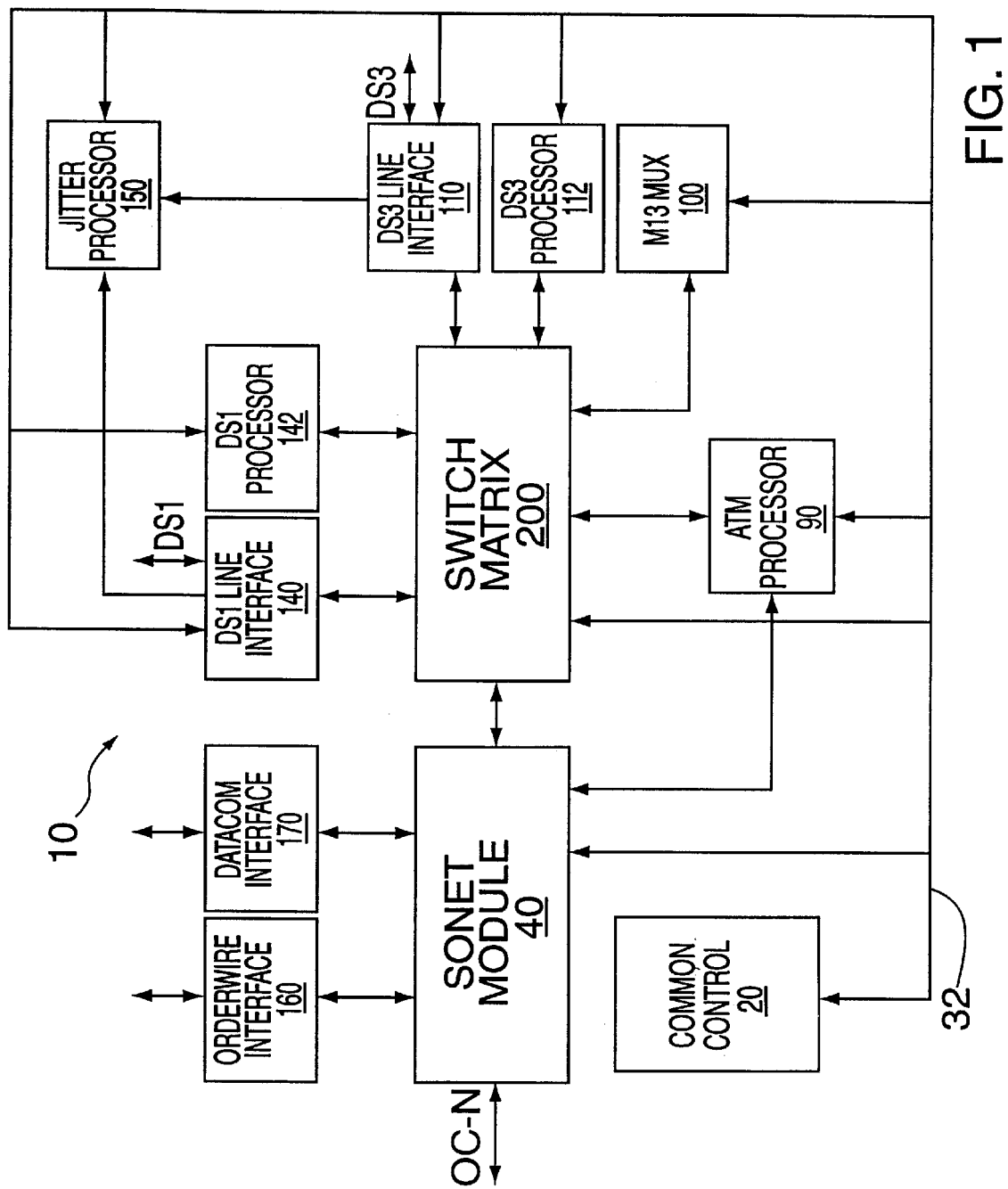
FIG. 1 is a generalized block diagram showing the interrelationship of the major components of the present invention.

Referring to FIG. 1, the test device and method of the present invention is embodied in a system block diagram 10. System 10 consists of several modules including a common control module 20, a SONET module 40, an ATM processor 90, an M13 multiplexer 100, a DS3 line interface 110, a DS3 processor 112, a DS1 line interface 140, a DS1 processor 142, a jitter processor 150, an orderwire interface 160, a datacom interface 170, and a switch matrix 200.

Figure 2:
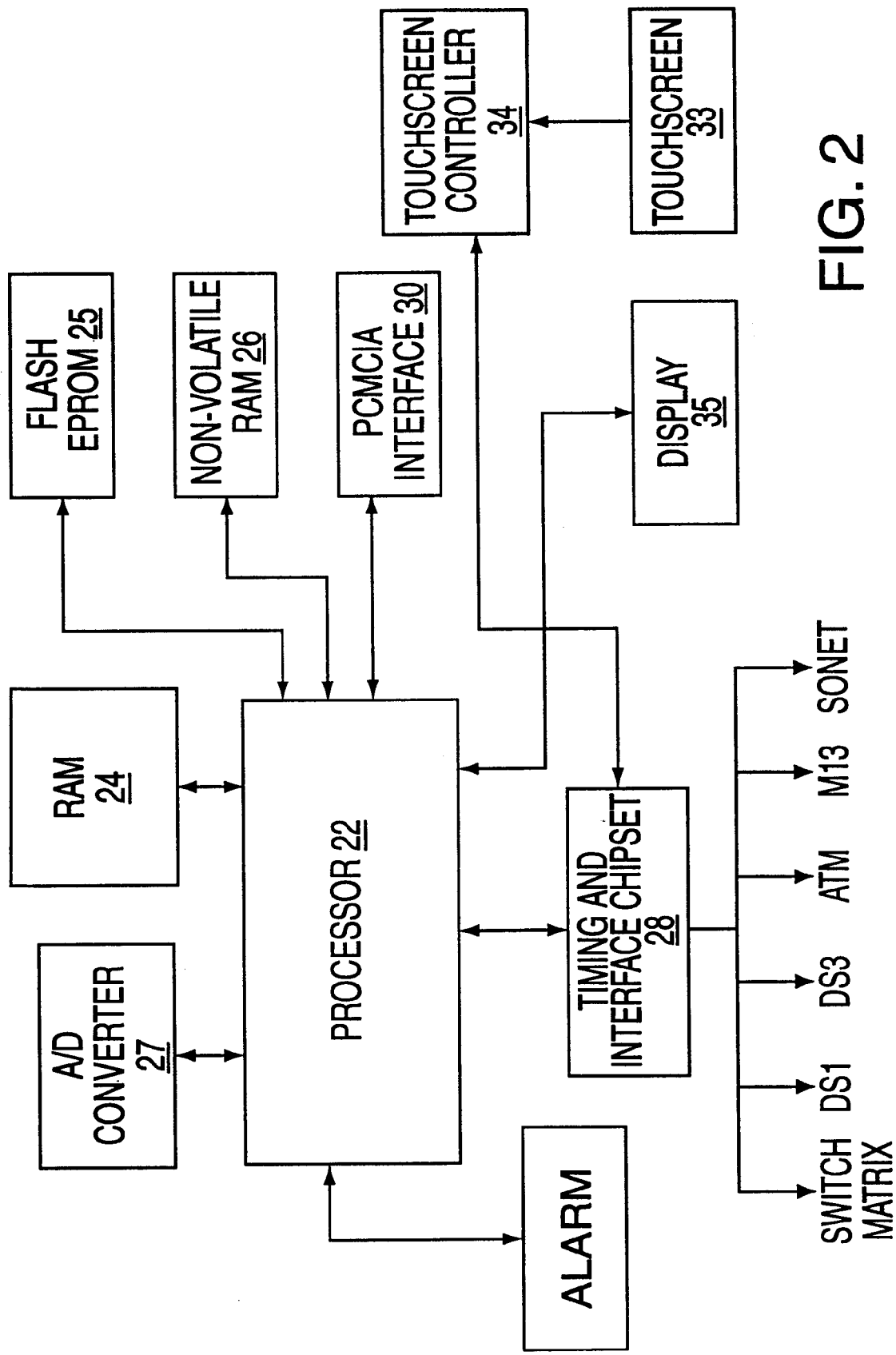
FIG. 2 is a block diagram of the processor section of the resent invention.

The features of the common control module 20 can best be appreciated with reference to FIG. 2. Common control module 20 consists of a high level microprocessor 22, RAM 24, FLASH EEPROM memory 25, non-volatile RAM 26, and associated timing and interface chip set 28. Analog to digital converter 27 permits the control module 20 to measure analog parameters. Control module 20 is further provided with a PCMCIA interface 30 to permit porting of the device using standard PCMCIA type 2 hardware. In this manner, data may be extracted and control information added to the present invention using a stand alone microcomputer. Microprocessor 22 may take the form of any commercially available high level microprocessor but is advantageously comprised of the Intel 80386s1 processor for its low power consumption and high speed processing capabilities. Processor 22 communicates with the other components of the present invention over data/address bus 32. Bus 32 is a standard eight bit mutliplexed data/address bus commonly used with Intel x86 series microprocessors. Address information is latched to the various devices of the system as desired and programming information and data are enabled over a common bus using time multiplexing in a conventional manner.

RAM 24 consists of commercially available dynamic random access memory with a nominal storage capacity of 10 megabytes. FLASH EEPROM 25 is also conventional in design with a storage capacity of 2 megabytes. Non-volatile RAM 26 consists of approximately 32 KB of any high speed non-volatile RAM such as SRAM with battery backup. Timing and interface chipset 28 includes a timing source, frequency counters, and related clock functions necessary to support the system. Chipset 28 further includes specialized interfaces such as RS-232 and GPIB interfaces to permit remote control of and communication with control module 20.

Control module 20 is also provided with a highly sophisticated display system which consists of touchscreen controller 33, touchscreen 34, and display 35. The display of the present invention is designed to provide an easy and intuitive graphical interface for test system 10. Through the use of embedded menus and object oriented programming, the present invention provides a powerful graphical user interface to the user. Display 35 is comprised of a LCD active matrix-color display capable of producing hundreds of colors. overlaying display 35 is a touchscreen 33 which consists of commercially available capacitive touch panel. Touchscreen 33 is controlled by touchscreen controller 34 which senses the position of an input to the system by polling touchscreen 33 and calculating the input position. Input position information is then passed back to microprocessor 22 for further use and processing. Information is presented on display 35 in distinct zones. Zones are created for the current test performed by the system and for virtual "buttons" used for operator input. The operator simply touches the screen in the indicated location to manipulate the system.

The processor sections of the present invention associated with each of the communications protocols are advantageously comprised of field programmable gate arrays such as those manufactured by the Xilinx Corporation. The use of field programmable gate arrays permits the present invention to adapt dynamically to changing test configurations and minimizes component cost. Prior art designs utilizing expensive application specific integrated circuits or discrete components are far more costly and less robust. The Xilinx gate arrays used in the present invention are widely used components with a well developed set of design tools for ease of implementation. These gate arrays are configured using configuration bit streams in a conventional manner. EEPROM 25 contains the byte sequences necessary to program the various gate arrays for tests and configurations supported by the present invention. Through manipulation of user interface 33, an operator designates which tests are to be run and in what configuration. Processor 22 then selects the desired test and logic configuration bit streams from EEPROM 25 and loads the configuration bit streams into the appropriate gate arrays via bus 32. Thus, the present invention can be dynamically programmed to accept a very large number of test schemes and configurations. In addition, as new communications protocols or test schemes are devised, additional test capabilities may be added to the present invention simply by distributing additional configuration bit streams to be downloaded into EEPROM 25 as appropriate. In this manner, the present invention may be upgraded and enhanced without modification of the hardware of the device.

Switch 200 also advantageously consists of a field programmable gate array such as those sold by Xilinx. Different configurations are accomplished under processor 22 control to enable the desired communications paths through the gate array. These gate arrays include logical data selectors which may be utilized to create a physical conductive path though the switch in response to configuration bit streams in a well known manner. By storing in EEPROM 25 those configuration bit streams associated with different pathways through the gate array, processor 22 may reconfigure switch 200 for different applications by loading selected bit streams into the gate array.

Figure 3:
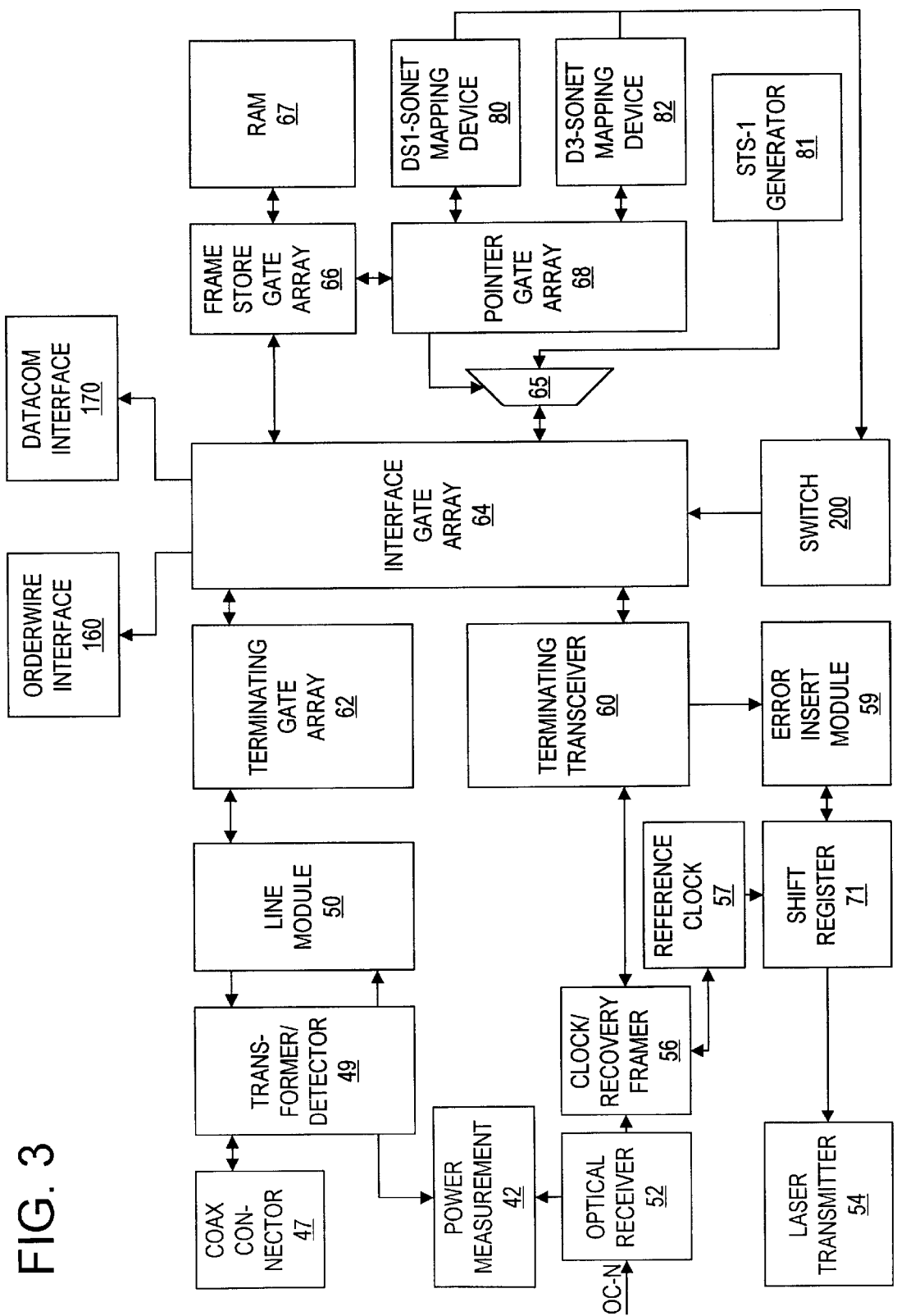
FIG. 3 is a block diagram depicting the SONET module of the present invention.

SONET module 40 is presented in expanded form in FIG. 3. SONET module comprises SONET interface and SONET processor subsystems. The SONET interface of the present invention is composed of both optical and electrical interface components. The electrical interface of the present invention accepts and terminates high speed bipolar encoded data through coaxial cable connector 47. A transformer/detector 49 isolates the external electrical signal from the internal circuit, performs filtering and impedance matching to condition the transmission line signal, and provides peak signal detection to power measurement circuit 42. Transformer/detector 49 also scales the voltage of an incoming signal to a suitable level. Line module 50 performs clock and data recovery functions and converts the incoming bipolar signal to a unipolar image of the incoming signal.

SONET module 40 also includes an optical interface comprising optical receiver 52 and laser transmitter 54 and supporting components. During OC-12 and OC-3 operation, optical receiver 52 senses incoming optical signals and feeds the clock recovery/framer 56, which performs clock and data recovery and framing functions. The output of the clock recovery/framer 56 is fed into terminating transceiver 60. Clock recovery/framer 56 must be instructed by processor 22 whether to operate in OC-3 or OC-12 mode. This module also requires a reference clock 57 which advantageously consists of 51.84 MHz crystal oscillator. Optical power measurement circuit 42 operates by switching a current reading resistor in series with optical receiver 52 in a conventional manner.

The output side of SONET module 40 consists of laser transmitter 54 which is fed by output shift register 71. Shift register 71 synthesizes the optical transmit clock of either 155.52 MHz or 622.08 MHz using an internal phase locked loop frequency synthesizer. The output side also includes an error insertion module 59 which generate pseudo random errors for use in line and device testing. The error insertion module 59 provides the capability to insert random errors at the section level on OC-3 or OC-12 traffic. The error insertion module 59 inserts errors in response to processor 22. Errors are rotated sequentially from bit 0 through bit 7 of typical payload data bytes.

SONET module 40 shown in FIG. 3 provides the interface between lower rate signals such as DS1, DS3, or ATM and the higher rate SONET signals. It also provides analysis and generation functions. Terminating transceiver 60 receives data from the optical interface components. Terminating transceiver 60 descrambles the data and processes much of the overhead. For electrical signal operation, SONET module 40 also includes field programmable gate array 62 which performs decoding and error generation for high speed electrical signals. Gate array 62 synchronizes both input and output signals to other received and system generated signals.

Signals from terminating transceiver 60 and terminating field programmable gate array 62 are synchronized in interface field programmable gate array 64 where any remaining overhead is removed from the signal. Interface gate array 64 also provides the interface to orderwire interface 160 and datacom interface 170. Orderwire interface 160 provides a voice channel for engineering use where the remote terminal is also equipped for an orderwire. Datacom interface 170 provides access to the maintenance and provisioning channels provided by SONET. At this point in the system, received signals are fully framed and may be manipulated within the system as desired. SONET module 40 is provided with access to switch matrix 200 at gate array 64. Switch 200 is thus provided with fully framed inbound and test device generated SONET signals.

SONET module 40 includes frame store field programmable gate array 66 which allows the capture of multiple data frames which may then be further analyzed by the system. Frame store array 66 supports logic analyzer operations for the SONET test set. Array 66 monitors the output of the SONET interface field programmable gate array 64 and controls the storing of frames in a 32K frame storage RAM 67.

Pointer field programmable gate array 68 captures pointer parameters monitored by the system. The received data is passed on from the pointer field programmable gate array 68 to DS1-SONET mapping device 80 and to DS3-SONET mapping device 82 to extract desired signals. Mapped signals are input from mapping devices 80 and 82 for further processing and insertion by pointer gate array 68. STS-1 generator 81 generates a nominal VT1.5 mapped STS-1 signal in byte wide format. Multiplexer 65 passes through the output from the STS-1 generator 81 until the pointer field programmable gate array 68 switches the multiplexer and inserts a single VT data byte into the STS-1 stream. In this way, VT channel insertion is achieved. In DS3 mapping, the entire STS-1 bandwidth is filled so multiplexer 65 is switched to the output of the pointer field programmable gate array 68 continuously and the STS-1 generator 81 is out of the circuit. In this way a valid STS-1 signal with the desired mapping is fed into interface gate array 64 for further processing before transmission.

Under processor control the DS1-SONET mapping device 80 selects which DS1 signal out of the 28 available to extract and process. DS1-SONET mapping device 80 demaps floating asynchronously mapped DS1 signals and forwards the DS1 signals to switch matrix 200. In VT1.5 mode, pointer gate array 68 saves the output from the DS1-SONET mapper device 80 in the form of a VT1.5 signal and stores each byte of data until the desired time slot (channel) arrives. Processor 22 instructs the pointer gate array 68 which channel to insert and the pointer gate array 68 has internal logic which keeps track of when to insert the VT1.5 byte. The pointer gate array 68 also provides random error insertion if desired.

Figure 4:
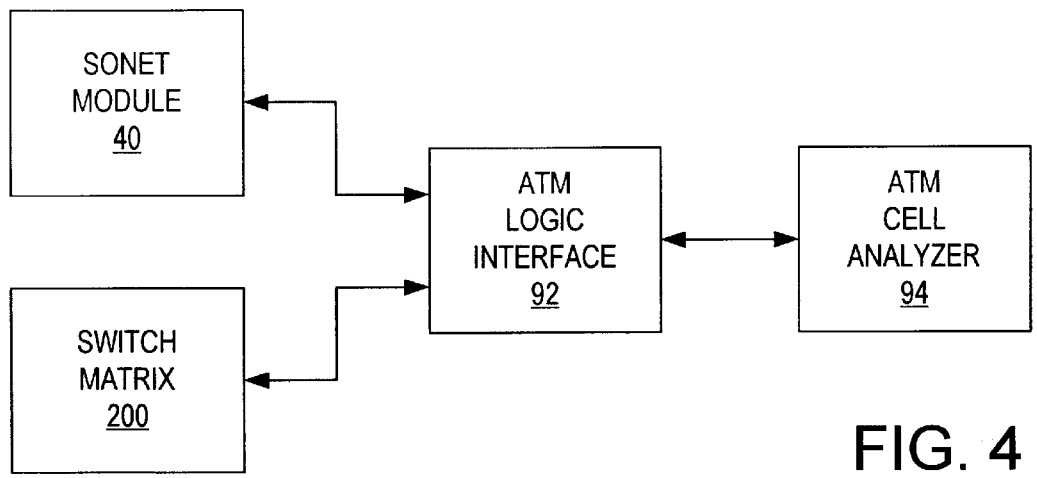
FIG. 4 is a block diagram depicting the ATM processor portion of the present invention.

DS3-SONET mapping device 82 provides the interface between DS3 signals and SONET signals just as the DS1-SONET mapping device serves DS1 signals. On the transmit side, the DS3 traffic is mapped into a SONET compatible format without framing or pointers and minimal other overhead. The data is then transferred to the pointer gate array 68. Processor 22 dynamically configures pointer gate array 68 to switch desired DS3 signals into the output SONET payload. The pointer field programmable gate array 68 also adds pointers and framing to the output stream whenever DS3 mapping is invoked. on the receive side, DS3 mapping device 82 demaps desired DS3 signals from the SONET payload. Both DS3 mapping device 82 and DS1 mapping device 80 are provided with access to switch matrix 200 to permit exchange of DS1 and DS3 signals with other modules of the test device. ATM processor 90 is shown in greater detail in FIG. 4. ATM processor 90 provides transmission and analysis of ATM traffic. ATM processor 90 accepts STS-12C, STS-3C or STS-1 signals from the SONET module 40 or DS3 or DS1 from switch matrix 200. ATM processor 90 employs a logic interface field programmable gate array 92 to interface ATM signals from SONET module 40 and switch matrix 200 and to provide processing logic to the correct line signal. Logic interface 92 includes OC-12 and OC-3 framer logic to accommodate SONET signals. For DS1 and DS3, ATM/TDM processor logic is used. Cell analyzer field programmable gate array 94 generates generic cells without attention to a particular ATM adaptation layer and strips data from ATM cells for use in the non-ATM portions of the system.

Figure 5:
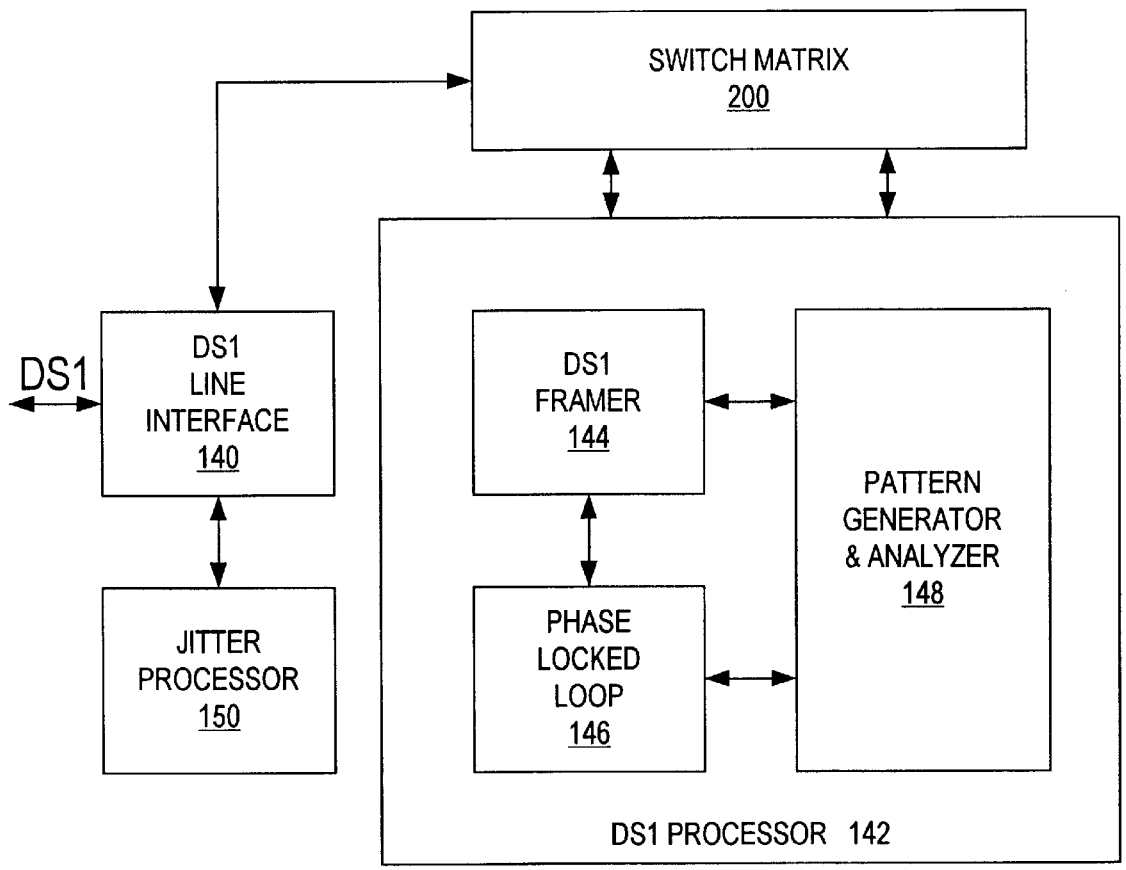
FIG. 5 is a block diagram of the DS1 module portion of the present invention.

The DS1 test set of the present invention is shown in greater detail in FIG. 5. The DS1 test set consists of a DS1 line interface 140, and a DS1 processor 142 which includes DS1 framer 144, a phase locked loop circuit 146 used to lock the DS1 transmit frequency to a reference, and pattern generator and analyzer gate array 148. DS1 line interface 140 provides the electrical interface to the DS1 line. It converts unipolar positive and negative signals into bipolar signals and vice versa. Dynamic provisioning is built into line interface 140 to support compatibility with different line lengths and also to support various loopback options for system tests. DS1 interface 140 is provided with a port on switch matrix 200 to permit the exchange of data with other components through switch matrix 200. DS1 interface 140 also provides DS1 signals to jitter processor 150. Jitter processor 150 senses short term timing variations in the DS1 and DS3 signals and generates alarms in response to error conditions.

DS1 framer 144 handles framing and decoding, and then forwards received data to the pattern generator and analyzer 148 where the data is further processed. Analyzer 148 is also advantageously comprised of a field programmable gate array. Error and alarm information from analyzer 148 is forwarded to processor 22 for further use and manipulation. Analyzer 148 and DS1 framer 144 generate error alarms to indicate fault conditions as specified by processor 22. Analyzer 148 provides error insertion capability by generating data errors, CRC errors, frame errors, and bipolar violation errors. Each of these may be generated either as single errors or at a specified error rate subject to processor 22 control. Access to switch matrix 200 is provided at both the DS1 framer 144 and at analyzer 148.

Communication between DS1 line interface 140 and DS1 processor 142 is accomplished through switch matrix 200. Each of DS1 line interface 140 and DS1 processor 142 is provided with a separate port on switch matrix 200. As a result, complete non-blocking access is provided between interface 140 and processor 142 and the other system components.

Figure 6:
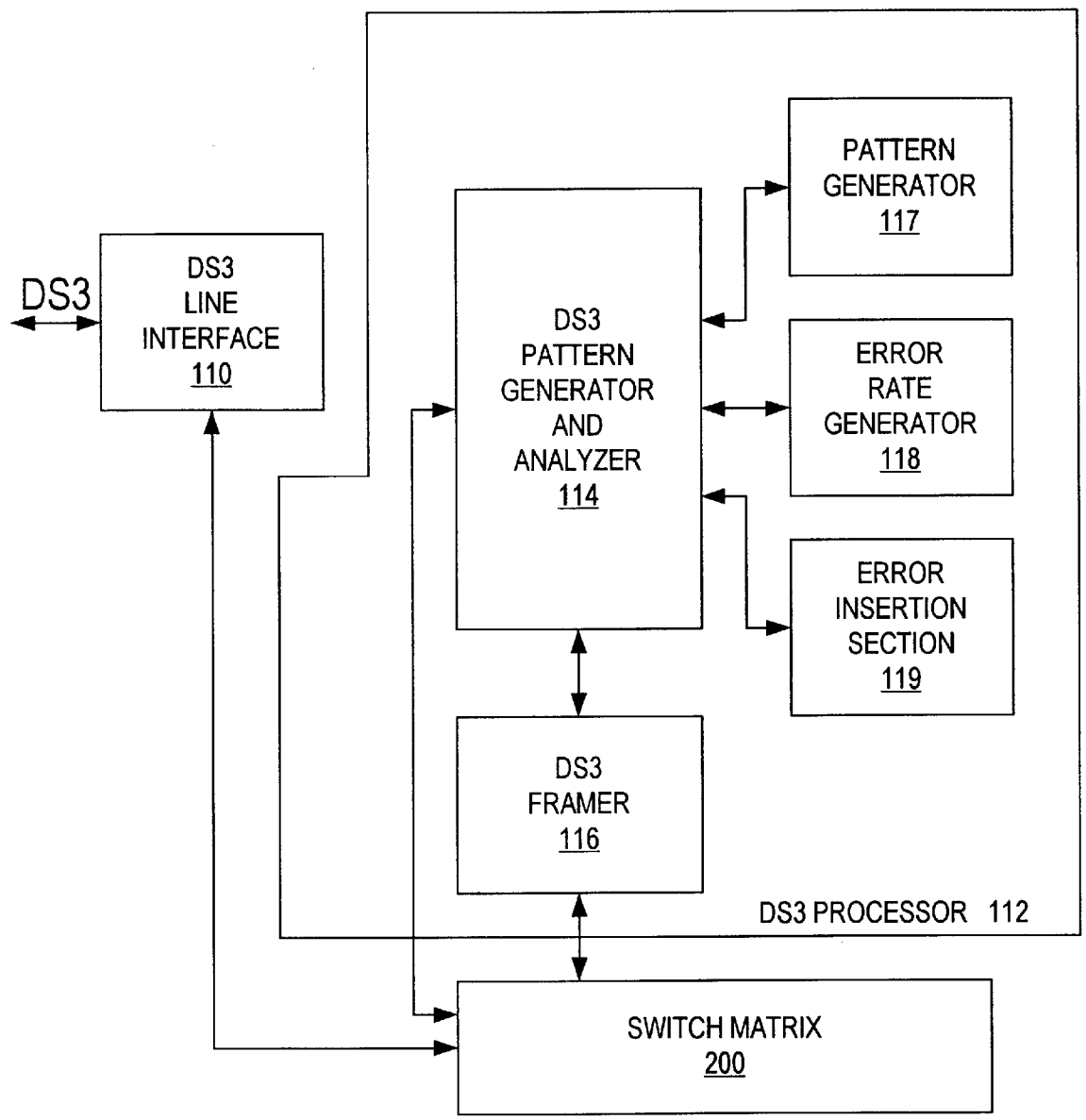
FIG. 6 is a block diagram of the DS3 module portion of the present invention.

The DS3 test set of the present invention is shown in greater detail in FIG. 6. The DS3 test set consists of a DS3 line interface 110 and DS3 processor 112. DS3 processor 112 consists of a DS3 signal pattern generator and analyzer 114, and a DS3 framer 116. DS3 analyzer 114 is able to synchronize to specific DS3 patterns and count errors and detect alarm conditions. DS3 analyzer 114 supplies error insertion signals to DS3 framer 116. Under processor 22 control, DS3 analyzer 114 provides the capability to insert a single bit error into any given test pattern or to provide a user designated bit error. DS3 analyzer 114 further provides the capability to insert a single bipolar violation into any given data stream, provide a user designated bipolar violation rate, or generate a repetitive bipolar violation as specified. DS3 analyzer 114 also is able to provide a framing bit error on demand (single bit), or provide continuous errors as specified. P-Parity and C-Bit parity errors may be inserted by DS3 Framer 116 under direction of analyzer 114. Far end alarm and control signal errors are generated by DS3 framer 116 under microprocessor 22 control.

Analyzer 114 consists of three main sections: a pattern generator 117, an error rate generator 118, and an error insertion section 119. Error rate generator 118 is set up to count based either on every bit, every framing bit, or every frame. Processor 22 configures error rate generator 118 as needed for the type of error rate being generated. Framing errors, C-bit parity and P-parity errors are detected by the framer 116. Other bit errors are detected by analyzer 114. Errors are reported to microprocessor 22 for display on display 35.

DS3 line interface 110 provides an interface to the DS3 bipolar line. Interface 110 includes a termination device to receive unipolar data and convert it to a bipolar signal suitable for driving a 75 ohm cable. Interface 110 also includes dynamic provisioning to emulate longer cable lengths. Line interface 110 is controlled by processor 22 in conjunction with a switched resistor to provide a different reflected impedance when desired. Line interface 110 also performs clock and data recovery functions.

Both DS3 line interface 110 and DS3 processor 112 are provided with dedicated ports on switch matrix 200 to permit the rapid exchange of data between these elements and other system modules. In addition, data is exchanged between interface 110 and processor 112 via switch matrix 200.

Figure 7:
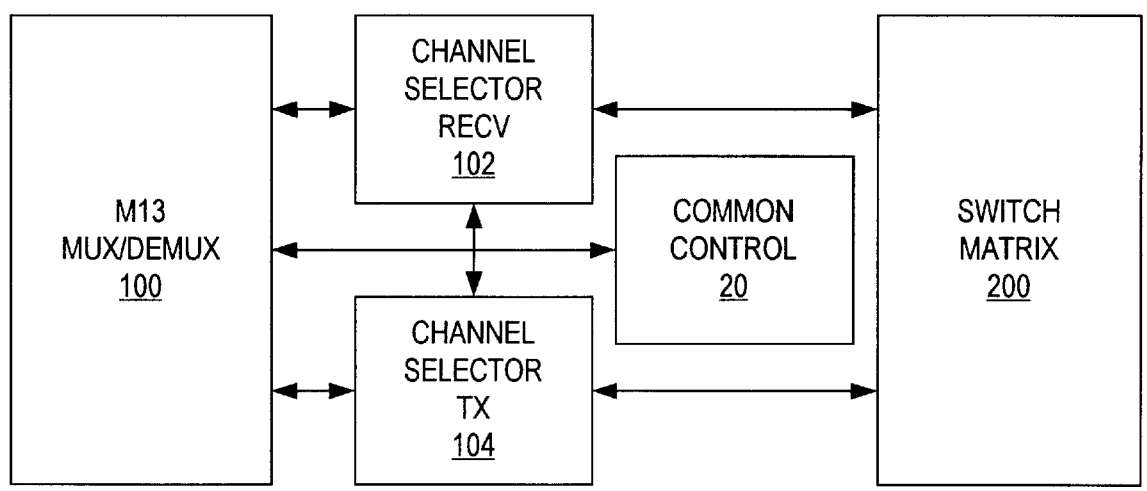
FIG. 7 is a block diagram showing the M13 mux portion of the present invention.

The M13 mux module 100 is shown in greater detail in FIG. 7. M13 mux 100 provides multiplexing and demultiplexing from DS3 to DS1. This feature is necessary in a test set in order to allow the inspection of traffic in a DS3 signal by the DS1 module. M13 mux 100 multiplexes 28 DS1 signals up to DS3. It uses a conventional multiplexer element and interfaces with receive channel select field programmable gate array module 102 and transmit channel select field programmable gate array module 104 as shown. A single DS1 is supplied from the switch matrix 200 to transmit channel select 104. Transmit channel select 104 places the DS1 on the selected input, as directed by processor 22, of the M13 mux 100 and fills the remaining DS1s with data from a DS1 generator. The M13 Mux device multiplexes the traffic in either C-Bit Parity or M13 mode. In M13 mode, the M13 mux 100 multiplexes through the DS2 stage thereby including DS2 framing.

The M13 Mux section also demultiplexes 28 DS1s from a DS3. A receive channel select 102 selects the desired DS1, as specified by processor 22, and forwards it to switch matrix 200. M13 mux 100 also provides information on intermediate DS2 level multiplexing in M13 mode, such as loss of frame.

Figure 8:
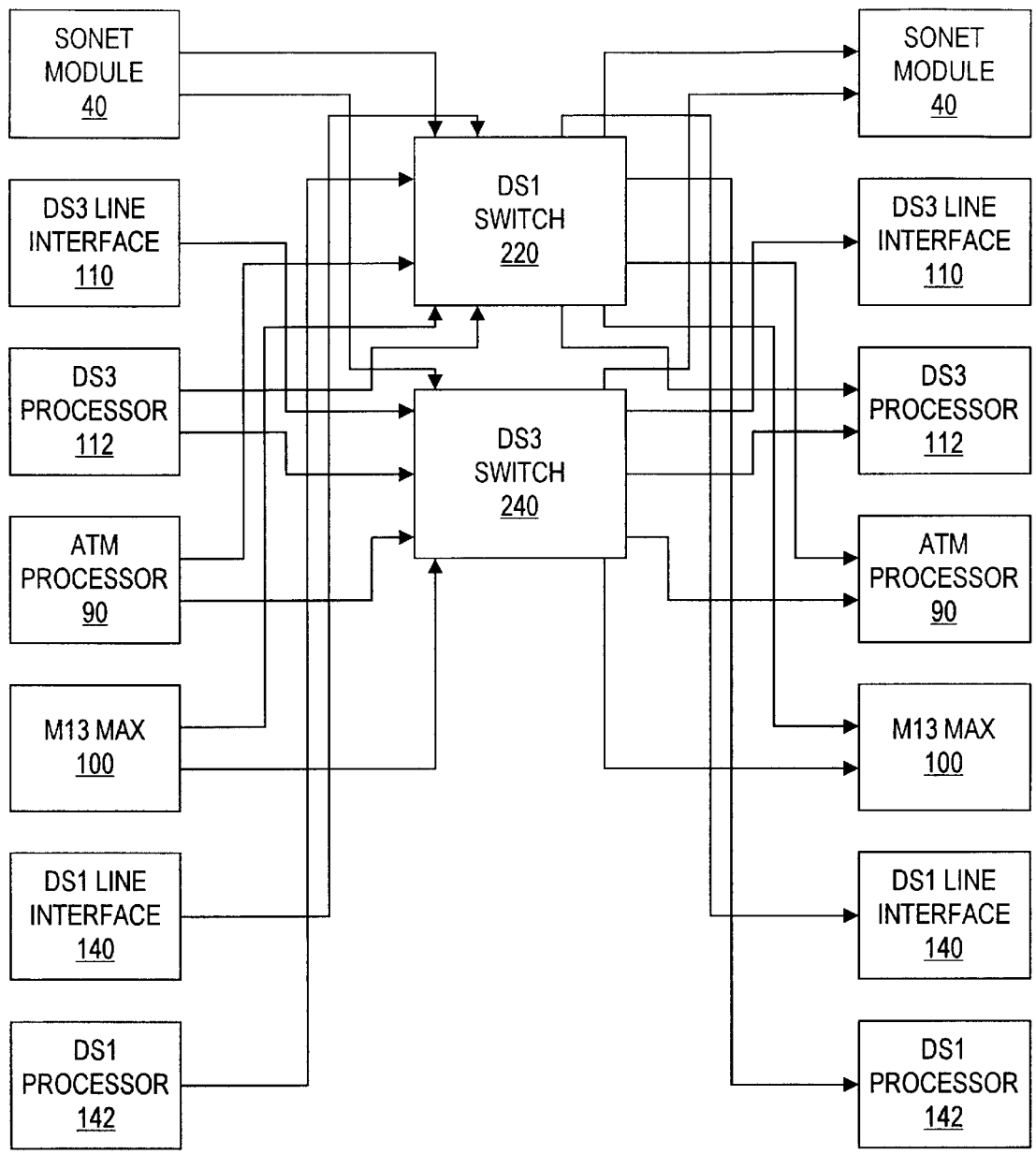
FIG. 8 is a block diagram showing the switch matrix of the present invention.

Switch matrix 200 is shown in greater detail in FIG. 8. Switch matrix 200 is composed of a collection of processor controlled logical data selectors. On the inputs of each of the data selectors are each of the possible sources for the output of that data selector, including the module used as the source to create an internal loopback capability. This allows for a completely non-blocking arrangement. Switch matrix 200 provides switching for data as well as clock signals through the switch fabric and maintains suitable clock and data relationships. In the case of DS3 signals, this requires tight control of delays and pulse integrity because of the speed of such signals. By separating switch matrix 200 into DS1 and DS3 modules, less expensive components may be utilized for the slower DS1 module.

Switch 200 consists of two primary modules, DS1 switch 220 and DS3 switch 240. DS1 switch 220 consists of a field programmable gate array and cross-connects DS1 signals from the M13 mux 100, SONET module 40, ATM Processor 90, DS1 line interface 140 and DS1 processor 142. Logical pathways are produced through DS1 switch 220 as a result of commands issued by processor 22. Upon receipt of a switching instruction, switch module 220 sets those logical data selectors to produce a high speed pathway between the desired switch ports. Similarly, DS3 switch 240 is contained in a high speed field programmable gate array and cross-connects signals from M13 mux 100, SONET module 40, ATM processor 90, DS3 line interface 110 and DS3 processor 112. These communications pathways are thus selectable as desired.

DS1 switch 220 allows the following connections in a non-blocking manner:

| | | | |
|---|---|---|---|
| 1) | To SONET Module 40 | From: | DS1 Line Interface 140 |
| | | | DS1 Processor 142 |
| 2) | To M13 Mux 100 | From: | DS1 Line Interface 140 |
| | | | DS1 Processor 142 |
| 3) | To ATM Processor 90 | From: | DS1 Line Interface 140 |
| | | | DS1 Processor 142 |
| 4) | To DS1 Line Interface 140 | From: | M13 Mux 100 |
| | | | SONET Module 40 |
| | | | ATM Processor 90 |
| | | | DS1 Processor 142 |
| 5) | To DS1 Processor 142 | From: | M13 Mux 100 |
| | | | SONET Module 40 |
| | | | ATM Processor 90 |
| | | | DS1 Line Interface 140 |

DS3 switch 240 allows the following connections in a non-blocking manner:

| | | | |
|---|---|---|---|
| 1) | To SONET Module 40 | From: | DS3 Line Interface 110 |
| | | | DS3 Processor 112 |
| | | | M13 Mux 100 |
| | | | ATM Processor 90 |
| 2) | To M13 Mux 100 | From: | DS3 Line Interface 110 |
| | | | SONET Module 40 |
| | | | ATM Processor 90 |
| 3) | To DS3 Interface 110 | From: | DS3 Processor 112 |
| | | | SONET Module 40 |
| | | | M13 Mux 100 |
| | | | ATM Processor 90 |
| 4) | To D53 Processor 112 | From: | DS3 Line Interface 110 |
| | | | SONET Module 40 |
| | | | ATM Processor 90 |
| 5) | ATM Processor 90 | From: | DS3 Line Interface 110 |
| | | | DS3 Processor 112 |
| | | | M13 Mux 100 |
| | | | SONET Module 40 |

Through the use of the switch 200, the present invention supports wholly novel test methods and capabilities. The switch 200 allows an extremely flexible test configuration that enables the user to perform tests or functions not previously available. In prior art devices, a single test is performed on a single line at any given time, even in systems which include more than one test bed. The dynamic routing and switching programmable gate arrays enables multiple test protocols to proceed simultaneously. FIG. 9 shows one of the basic configurations that can be set up using the switch 200. Each test set can be set up to exercise and monitor one line protocol simultaneously. In prior art devices, this would require three separate test instruments. The ability to perform simultaneous testing within a single platform thus replaces three separate instruments, providing significant cost savings in central office environments. The switch 200 is key to allowing this sort of operation as it allows a complete reconfiguration of the instrument to operate in this fashion.

FIG. 9A depicts one such simultaneous test protocol. DS3 line interface 110 is mated to a DS3 source such as a DS3 cable bay. DS1 line interface 140 is mated to a DS1 source such as a DS1 cable bay. SONET module 40 is mated to an OC-12 source such as an optical patch bay. Because each of the DS3 test set, DS1 test set, and SONET module 40 have individual line interfaces and processing sections, all three protocols may be tested simultaneously. DS1 signals are received by line interface 140 and passed to DS1 processor 142 through switch 200. Similarly, DS3 signals are received by line interface 110 and are passed to DS3 processor 112 through switch 200. Processor 22 collects data from all three active test modules and reports results such as errors and alarms on display 35. This is in contrast to prior art devices which were dedicated to a single test at a time. This required test operations to be performed in series, requiring a significantly longer test period.

FIG. 9B presents an example where simultaneous testing can be performed on a single signal stream. DS3 line interface 110 is again mated with a DS3 signal source and SONET module 40 is mated with an OC-12 source. DS3 line interface 110 passes DS3 signals to DS3 processor 112 via switch 200 where processor 112 performs testing of the DS3 input data stream and SONET module 40 performs testing of the optical stream. In this case, SONET module 40 also extracts a desired DS1 signal from the incoming OC-12 payload and forwards that signal to DS1 processor 142 through switch 200. Thus testing of an independent DS3 signal, an independent OC-12 signal and an embedded DS1 signal can proceed simultaneously. FIG. 9C presents a still further example of simultaneous testing of an independent DS1 and OC-12 signals, and an embedded DS3. DS1 interface 140 accepts a DS1 signal and passes it to DS1 processor through switch 200. SONET module 40 receives an OC-12 signal and extracts an embedded DS3 signal. Embedded DS3 signal is then passed to DS3 processor 112 for analysis via switch 200. Because switch matrix 200 is dynamically configurable, different testing setups can be achieved by simply reconfiguring switch 200. User inputs are translated into configuration bit streams selected from EEPROM 25 and loaded into switch 200 by processor 22. In this manner, the user may set up a large number of simultaneous test setups using only the test device of the present invention.

FIG. 10 demonstrates still further examples of the novel testing protocols supported by the present invention. Importantly, these examples utilize a single instrument set up. This is extremely valuable to equipment manufacturers who must validate multiple modes of operation of their equipment in as little time as possible. FIG. 10A provides a schematic diagram of a typical test device configuration to test a SONET multiplexer, a common telecommunications network component. Customer SONET multiplexer 280 is mated to the DS1 line interface 140, DS3 line interface 110, and SONET module 40 with appropriate cabling. With only those cables in place, each of the following test protocols is supported.

Figure 10A:
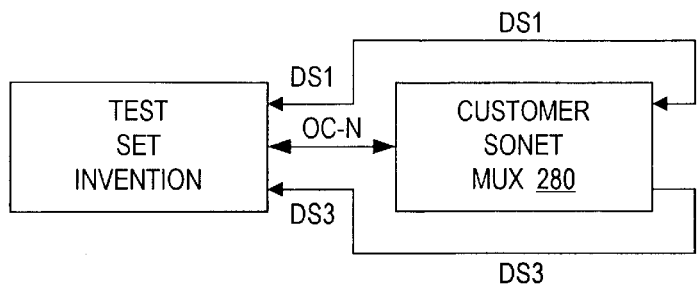
FIGS. 10A–G are further block diagrams of the novel simultaneous testing methodology supported by the present invention showing multiple tests performed on the same data stream.
Figure 10B:
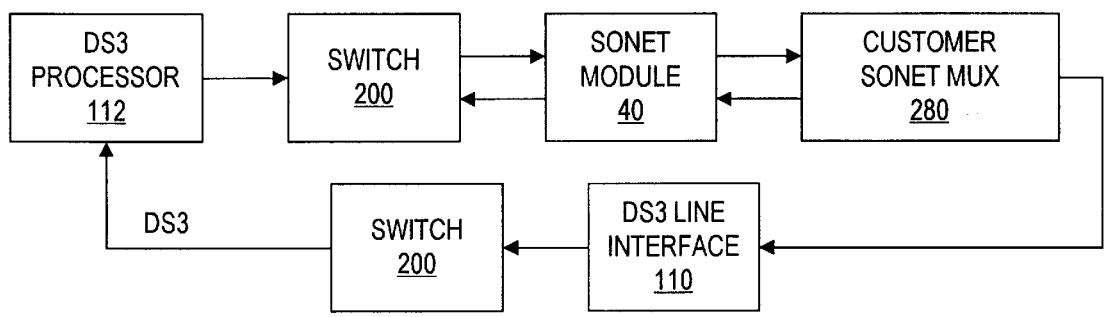

FIG. 10B shows the use of the present invention to test the ability of the customer mux 280 to demap DS3 signals from a SONET stream. Under this test, DS3 processor 112 produces a desired DS3 stream that is then fed into SONET module 40 through switch 200. SONET module 40 maps the incoming DS3 signal into an OC-12 signal which is passed to customer mux 280. Customer mux 280 then performs its internal demapping to extract the DS3 signal which is then routed back to DS3 line interface 110. The extracted signal is then routed back to DS3 processor 112 through switch 200 for evaluation and analysis. Simultaneously, customer mux 280 can be configured to also produce an output SONET signal which is routed back to SONET module 40. In this manner, the internal functioning of the customer mux 280 can be simultaneously evaluated as to DS3 and SONET signals. This simultaneous testing is important because under operating conditions, devices such as customer mux 280 are typically required to accept and process a number of. signals simultaneously. Problems which only manifest themselves under simultaneous testing conditions may not be detected using prior art single test set protocols. Utilizing the present invention, however, a technician can introduce multiple signals to the device under test to determine functionality under true working conditions. This is important because in certain applications, a transmitter for one signal protocol may be affected by a transmitter or receiver for another signal protocol, and failure to simultaneously monitor more than one protocol would fail to detect those errors.

Figure 10C:
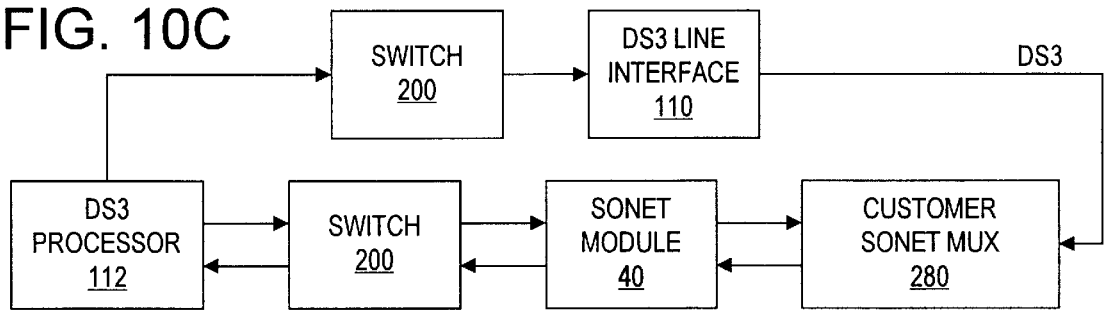

FIG. 10C shows the use of the present invention to determine the ability of the customer mux to map DS3 signals into a high speed optical signal. In this case, DS3 processor 112 produces a DS3 signal which is passed to DS3 line interface 110 via switch 200. In turn, line interface 110 passes the generated DS3 signal to customer mux 280. At the same time, SONET module 40 produces an optical signal such as an OC-3 and that signal is passed to customer mux 280. Customer mux 280 is directed to map the DS3 signal into the OC-3 signal which is then passed back to SONET module 40. SONET module 40 evaluates the integrity of the optical stream produced by customer mux 280 and further extracts the generated DS3 signal from the payload. The extracted DS3 signal is passed to DS3 processor 112 via switch 200. The extracted DS3 signal is then evaluated by DS3 processor 112 to determine whether the mapping function performed by customer mux 280 was sound.

Figure 10D:
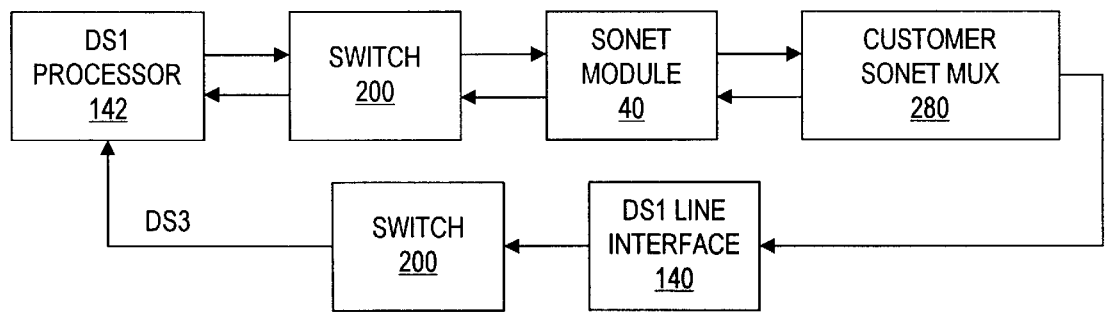
Figure 10E:
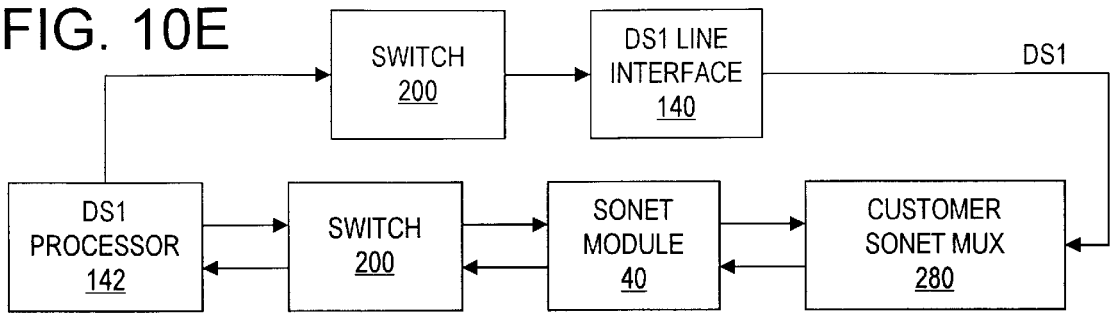

FIGS. 10D and 10E represent similar test protocols to that presented in FIGS. 10B and 10C with the exception that the lower order signal used is a DS1 instead of a DS3. The device under test can be driven with DS1 or DS3 or other test signals by simply rerouting such signals through switch matrix 200. In this manner, new simultaneous protocols may be designed and implemented using the present invention. Multiple test protocols can proceed simultaneously, even on a common data stream.

Figure 10F:
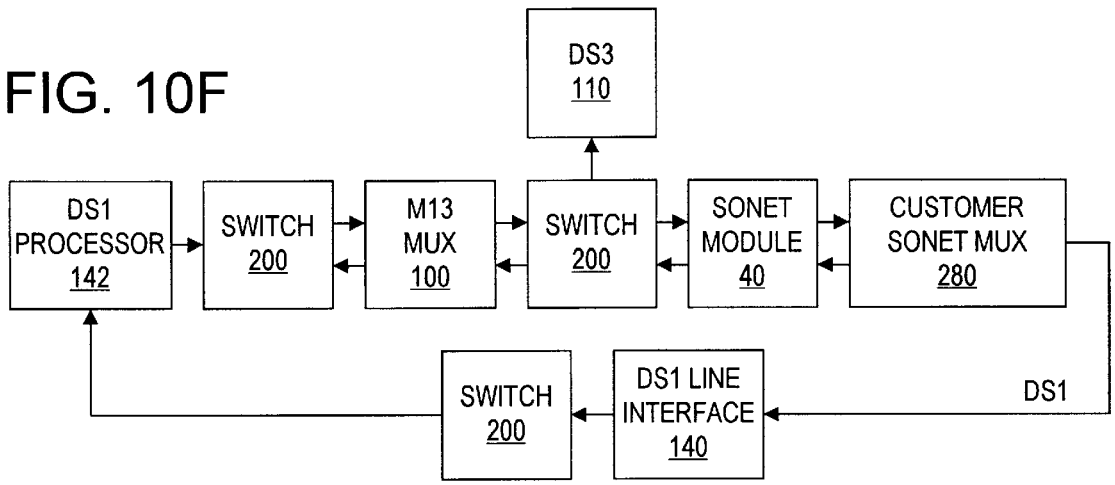
Figure 10G:
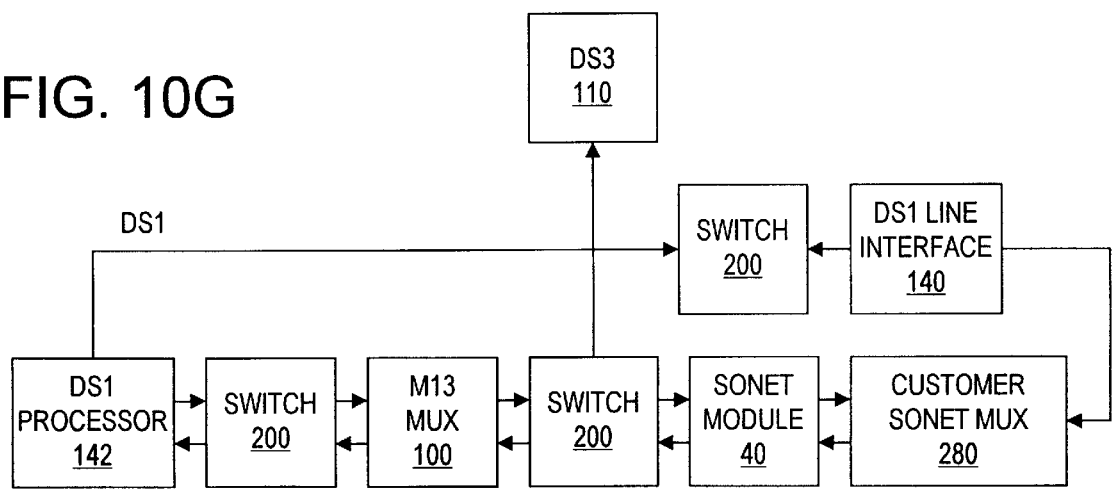

Still further examples of the novel test protocols supported by the present invention are found in FIGS. 10F and 10G. In FIG. 10F, customer mux 280 is subject to simultaneous testing of its signal drop capabilities. DS1 processor 142 produces a DS1 test signal which is passed to the M13 mux 100 through switch 200. M13 mux 100 then adds additional DS1 signals to form a composite DS3 signal. That composite signal is then routed through switch 200 to SONET module 40 where it is embedded in an OC-12 signal which is then passed to customer mux 280. Customer mux 280 is instructed to extract the DS3 stream containing the DS1 test signal and to demux the desired DS1 signal out of that stream. The DS1 test signal is then returned to DS1 line interface 140 where it is received and directed to DS1 processor 142 for analysis and evaluation via switch 200. Simultaneously, customer mux 280 is instructed to extract the OC-3 component containing the original DS1 test signal and to return that OC-3 signal to SONET module 40. SONET module 40 then demaps the DS3 component containing the test signal and forwards that signal to DS3 processor 112 through switch 200. In this manner, the ability of customer mux 280 to extract multiple lower order signals from a high speed input is fully evaluated under full working load conditions. In addition, framing and data errors can be detected under different protocols simultaneously thus reducing overall test time.

In FIG. 10G, customer mux 280 is tested as to its signal insert capabilities. Again beginning with DS1 processor 142, DS1 processor 142 produces a DS1 test signal which is passed to switch 200, then to line interface 140 for transfer to customer mux 280. customer mux 280 is directed to embed that DS1 signal into a DS3 signal and then embed that DS3 into an OC-12 SONET signal which is then returned to the present invention at SONET module 40. SONET module 40 then extracts the DS3 test signal and forwards that signal through switch 200 to both M13 mux 100 and to DS3 processor 112. The ability of switch 200 to create dynamic communications paths permits this flexible distribution of signals. DS3 processor 110 performs analysis and evaluation of the received signal. At the same time, M13 mux 100 demuxes the embedded DS1 test signal from the received stream and forwards that signal to the DS1 processor 142 again through switch matrix 200. DS1 processor 142 then conducts analysis and evaluation of the returned DS1 test signal. Switch 200 thereby supports fully simultaneous testing of the same data stream emanating from the device under evaluation.

It should be appreciated that there has been disclosed in accordance with the present invention, the preferred embodiment of an improved telecommunications test apparatus and method. It is evident that many alternatives, common modifications, and variations would be apparent to one of ordinary skill in the art in light of the description set forth herein. Accordingly, the present invention is intended to embrace all such alternatives, modifications, and variations that fall within the spirit and broad scope of the following appended claims.

SUMMARY OF MAJOR ADVANTAGES OF THE INVENTION

After reading and understanding the foregoing detailed description of a dynamic communication line analyzer apparatus and method in accordance with preferred embodiments of the invention, it will be appreciated that several distinct advantages of the subject dynamic communication line analyzer apparatus and method are obtained.

Without attempting to set forth all of the desirable features of the instant dynamic communication line analyzer apparatus and method, at least some of the major advantages include providing a SONET module, a DS1 test set, a DS3 test set, a processor in communication with at least one of the SONET module, DS1 test set or DS3 test set, and a switch matrix in communication with the SONET module, DS1 test set, and DS3 test set wherein the switch matrix creates communications pathways for the exchange of data between at least two of the SONET module, DS1 test set, and the DS3 test set.

The advantages of the subject invention are further exemplified by a M13 multiplexer for multiplexing DS1 and DS3 signals wherein the switch matrix is also placed in communication with the M13 multiplexer to create a selective communication pathway between the M13 multiplexer and at least one of the SONET module, the DS1 test set and the DS3 test set. Similarly, an ATM module for processing asynchronous transfer mode signals is preferably provided wherein the switch matrix is also placed in communication with the ATM module to create a selective communication pathway between the ATM module and at least one of the SONET module, the DS1 test set and the DS3 test set. The user interface aspects of the subject invention include a display adapted to present data under the control of the processor and a touchscreen adjacent the display adapted to sense the position of an operator's touch to indicate input data.

The novel method of the subject invention includes providing an interface to a line carrying a SONET communications signal, providing an interface to a line carrying a DS1 communications signal, providing an interface to a line carrying a DS3 communications signal, and simultaneously performing analysis on the SONET communications signal, the DS3 signal and the DS1 signal. The novel method further includes generating a first protocol signal and supplying the first protocol signal to a communications device, receiving a second protocol signal from the communications device containing the first protocol signal embedded therein, extracting the embedded first protocol signal from the second protocol signal, and comparing the embedded first protocol signal to the original first protocol signal to determine communications device performance.

We claim:
1. A communication line test device comprising:,
   a plurality of test processors;
   at least one line interface to the communication line carrying signals to be tested;
   a switch matrix in communication with said test processors and said line interface permitting simultaneous testing by said test processors of said signals, said switch matrix comprising a plurality of logical data selectors which selectively create communications pathways for the exchange of data between said test processors and said line interface, said switch matrix further comprising a field programmable gate array;
   memory for storing a logic configuration;
   a microprocessor connected to said memory and said field programmable gate array for loading said logic configuration into said field programmable gate array; and
   a display system connected to said microprocessor for creating and choosing said logic configuration.
2. A method of testing a communication line utilizing a single instrument setup comprising:
   providing an interface to a line carrying a first protocol signal;
   extracting a second protocol signal embedded within said first protocol signal; and
   simultaneously performing analysis on said first protocol signal and said second protocol signal.

* * * * *